(12) United States Patent
Chang et al.

(10) Patent No.: US 8,681,652 B2
(45) Date of Patent: Mar. 25, 2014

(54) METHOD, APPARATUS, AND SYSTEM FOR DETERMINING AND MAINTAINING QUALITY OF SERVICE PARAMETERS ON A MULTI-HOP NETWORK

(75) Inventors: Ningjuan Chang, Shenzhen (CN); Ke Wang, Shenzhen (CN); Yan Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 13/361,203

(22) Filed: Jan. 30, 2012

(65) Prior Publication Data

US 2012/0127883 A1    May 24, 2012

Related U.S. Application Data

(63) Continuation of application No. PCT/CN2010/075103, filed on Jul. 12, 2010.

(30) Foreign Application Priority Data

Jul. 31, 2009    (CN) .......................... 2009 1 0165457

(51) Int. Cl.
*H04L 12/26* (2006.01)
(52) U.S. Cl.
USPC .......................................... 370/252; 370/328
(58) Field of Classification Search
USPC .................................................. 370/252, 328
See application file for complete search history.

(56) References Cited

U.S. PATENT DOCUMENTS

| | | | |
|---|---|---|---|
| 2008/0002608 A1* | 1/2008 | Zheng et al. ................. | 370/328 |
| 2008/0051121 A1 | 2/2008 | Zou et al. | |
| 2008/0317465 A1 | 12/2008 | Yu et al. | |
| 2009/0003260 A1 | 1/2009 | Guo et al. | |
| 2009/0103454 A1* | 4/2009 | Watanabe et al. ............. | 370/254 |
| 2009/0219853 A1* | 9/2009 | Hart et al. .................... | 370/315 |

FOREIGN PATENT DOCUMENTS

| | | |
|---|---|---|
| CN | 1558637 A | 12/2004 |
| CN | 1578256 A | 2/2005 |
| CN | 1691552 A | 11/2005 |
| CN | 1708147 A | 12/2005 |
| CN | 1747468 A | 3/2006 |

(Continued)

OTHER PUBLICATIONS

International Search Report issued Oct. 21, 2010 in corresponding International Patent Application No. PCT/CN2010/075103.

(Continued)

*Primary Examiner* — Wanda Z Russell
(74) *Attorney, Agent, or Firm* — Staas & Halsey LLP

(57) ABSTRACT

Disclosure of the present embodiments relate to a method, an apparatus, and a system for determining and maintaining quality of service parameters on a multi-hop network. The method for determining QoS parameters on a multi-hop network includes: in a data transmission process in a transmission path from a user equipment to an evolved NodeB, acquiring statistics of QoS parameters of a relay link in the transmission path; and determining, according to the statistics of the QoS parameters of the relay link and in combination with QoS parameters that need to be maintained in the transmission path and radio interface topology information in the transmission path, QoS parameters that need to be acquired by an access link and the relay link in the transmission path.

17 Claims, 7 Drawing Sheets

In a data transmission process in a UE<—>eNB transmission path, the eNB acquires statistics of QoS parameters of a relay link in the UE<—>eNB transmission path    201

The eNB determines, according to the acquired statistics of the QoS parameters of the relay link and in combination with QoS parameters that need to be maintained in the transmission path and radio interface topology information in the transmission path, QoS parameters that need to be acquired by an access link and the relay link in the transmission path    202

(56) References Cited

FOREIGN PATENT DOCUMENTS

| CN | 1812447 | A | 8/2006 |
|---|---|---|---|
| CN | 1842106 | A | 10/2006 |
| CN | 1852586 | | 10/2006 |
| CN | 1996991 | | 7/2007 |
| CN | 101043700 | A | 9/2007 |
| CN | 101237374 | A | 8/2008 |
| CN | 101263695 | A | 9/2008 |
| CN | 101345903 | A | 1/2009 |
| EP | 2066143 | A1 | 6/2009 |
| WO | WO 2007/012024 | A1 | 1/2007 |

OTHER PUBLICATIONS

Written Opinion of the International Searching Authority issued Oct. 21, 2010 in corresponding International Patent Application No. PCT/CN2010/075103.

Chinese Search Report dated Sep. 7, 2012 in Chinese Patent Application No. 2009101654577.

Yu, Derek et al.; IEEE C802.16j-07/101r7. Project: IEEE 802.16 Broadband Wireless Access Working Group <http://ieee802.org/16>; Title: Dedicated Resources Assignment for RS; Date Submitted: Mar. 15, 2007.

IEEE Standard 802.16j for Local and metropolitan area networks; Part 16: Air Interface for Broadband Wireless Access Systems; Amendment 1: Multiple Relay Specification; IEEE Computer Society and the IEEE Microwave Theory and Techniques Society; dated Jun. 12,. 2009.

3GPP TSG-RAN2 Meeting #66bis; Los Angeles, USA, Jun. 29 - Jul. 2, 2009; R2-093961; Source: Fujitsu; Title: Comparison of EPS Bearer Service Architecture for Relay Alternatives; Document for: Discussion; Agenda Item: 7.4.

3GPP TSG-RAN WG3 Meeting #65; R3-091557; Agenda item: 13.1.2.1; Source: CATT; Title: QoS control in E-UTRAN with RN; Document for: Discussion and Approval.

3GPP TSG RAN WG3 #66; R3-092770; Title: Common problems faced by all the relay architecture alternatives; Source: Huawei; Agenda item: 15.1.2; Document for. Disc..

Written Opinion of the International Searching Authority related to Application No. PCT/CN2010/075103; for Huawei Tech Co., Ltd. et al.; mailed Oct. 21, 2010.

PCT International Search Report relating to Application No. PCT/CN2010/075103; for Huawei Tech Co., Ltd et al.; mailed Oct. 21, 2010.

European Patent Office Communication regarding the extended European search report pursuant to Rule 62 EPC, the supplemental European search report (Art. 153(7)EPC) and the European search opinion relating to Application No. 10803879.5-2412, for Huawei Tech Co., Ltd., mailed Mar. 16, 2012.

\* cited by examiner

METHOD, APPARATUS, AND SYSTEM FOR DETERMINING AND MAINTAINING QUALITY OF SERVICE PARAMETERS ON A MULTI-HOP NETWORK

CROSS-REFERENCE TO RELATED APPLICATIONS

This application is a continuation of International Application No. PCT/CN2010/075103, filed on Jul. 12, 2010, which claims priority to Chinese Patent Application No. 200910165457.7, filed on Jul. 31, 2009, both of which are hereby incorporated by reference in their entireties.

FIELD OF THE INVENTION

The present invention relates to the field of communications technologies, and in particular, to a method, an apparatus, and a system for determining and maintaining quality of service parameters on a multi-hop network.

BACKGROUND OF THE INVENTION

After a relay node (Relay Node, RN) is introduced into a long term evolution (Long Term Evolution, LTE) system, a user equipment (User Equipment, UE) may access a base station through the RN, where the base station is an evolved NodeB (evolved Node B, eNB). In this way, a radio interface (radio interface) from the UE to the eNB changes from a single-hop radio interface to a multi-hop radio interface.

In the existing LTE system, the quality of service (Quality of Service, QoS) of the radio interface from the UE to the eNB is generally maintained by scheduling. The scheduling mainly includes the uplink scheduling and downlink scheduling performed by the eNB. Generally, the following parameters are considered for the scheduling: channel quality, QoS parameter information, sleep cycle and measurement gap (GAP) of the UE, state information of a service, and system parameters (for example, system bandwidth). In a bearer setup process, a policy and charging rules function (PCRF) first decides QoS parameters of an evolved packet system (Evolved Packet System, EPS) bearer by using a policy and charging control (PCC) judgment mechanism; a device on the core network sends the QoS parameters of the EPS bearer to the eNB through a bearer setup request message; after receiving the bearer setup request message, the eNB maps the QoS parameters of the EPS bearer to QoS parameters of a radio bear (Radio Bear, RB for short) to perform corresponding RB configuration and use the QoS parameters as the scheduling parameters of the radio interface. When the UE accesses the eNB through a single hop, the eNB only needs to schedule the single-hop link according to the QoS parameters of the RB and in combination with other scheduling parameters to maintain the QoS parameters of the bearer.

After the RN is introduced into the LTE system, the radio interface changes from a single-hop radio interface to a multi-hop radio interface. Different from the scheduling of the link from the UE to the eNB in a single-hop scenario, the scheduling in a multi-hop scenario is divided into centralized scheduling and distributed scheduling. Assuming that a transmission path from the UE to the eNB is UE<—>RN1<—>RN2<—>eNB, that is, the path from the UE to the eNB passes through two RNs and the radio interface is a three-hop radio interface, where "<—>" is a double arrow, indicating a link between a left node of the double arrow and a right node of the double arrow. Through the link, the two nodes can exchange signaling and data information with each other. In a distributed scheduling mode, the eNB is responsible for scheduling the RN2<—>eNB link, the RN2 is responsible for scheduling the RN1<—>RN2 link, and the RN1 is responsible for scheduling the UE<—>RN1 link. In the distributed scheduling mode, parameters considered in the scheduling of the link from the UE to the eNB in the single-hop scenario are not applicable, for example, a delay parameter in the QoS parameters. A considerable delay may increase in the service data in each hop relay process. In addition, the impact of the delay on a time division duplex (TDD) system and a frequency division duplex (FDD) system may vary. Therefore, according to QoS parameters that need to be maintained in the UE<—>eNB transmission path, the existing eNB determines QoS parameters that need to be maintained by the links undertaken by each RN, and delivers the determined QoS parameters to each RN, so that each RN can schedule the links undertaken by the each RN. Therefore, the QoS maintenance mechanism cannot meet the QoS maintenance requirements in the multi-hop scenario.

SUMMARY OF THE INVENTION

Embodiments of the present invention provide a method, an apparatus, and a system for determining and maintaining QoS parameters on a multi-hop network.

An embodiment of the present invention provides a method for determining QoS parameters on a multi-hop network, including:

in a data transmission process in a transmission path from a UE to a base station, acquiring statistics of QoS parameters of a relay link in the transmission path, where the statistics of the QoS parameters of the relay link are statistics collected on changed QoS parameters in the relay link; and determining, according to the statistics of the QoS parameters of the relay link and in combination with QoS parameters that need to be maintained in the transmission path and radio interface topology information in the transmission path, QoS parameters that need to be acquired by an access link and the relay link in the transmission path.

An embodiment of the present invention further provides a method for maintaining QoS on a multi-hop network, including:

in a data transmission process in a transmission path from a UE to a base station, receiving QoS parameters that are sent from the base station and need to be acquired by local-hop links, where the QoS parameters that need to be acquired by the local-hop links are determined by the base station according to acquired statistics of QoS parameters of a relay link in the transmission path and in combination with QoS parameters that need to be maintained in the transmission path and radio interface topology information in the transmission path, and the local-hop links are direct links of RNs from the UE to RNs in the transmission path and include an access link and the relay link in the transmission path; and acquiring, according to the received QoS parameters that need to be acquired by the local-hop links, QoS parameters that need to be maintained by the local-hop links, and making a scheduling decision on the local-hop links to maintain QoS of a traffic flow corresponding to the QoS parameters.

An embodiment of the present invention further provides a base station, including an acquiring unit, configured to acquire, in a data transmission process in a transmission path from a UE to a base station, statistics of QoS parameters of a relay link in the transmission path, where the statistics of the QoS parameters of the relay link are statistics collected on changed QoS parameters in the relay link; and a determining unit, configured to determine, according to the statistics of the QoS parameters of the relay link acquired by the acquiring unit and in combination with QoS parameters that need to be maintained in the transmission path and radio interface topology information in the transmission path, QoS parameters that need to be acquired by an access link and the relay link in the transmission path.

An embodiment of the present invention further provides a relay node, including:

a receiving unit, configured to receive, in a data transmission process in a transmission path from a UE to a base station, QoS parameters that are sent from the base station and need to be acquired by local-hop links, where the QoS parameters that need to be acquired by the local-hop links are determined by the base station according to acquired statistics of QoS parameters of a relay link in the transmission path and in combination with QoS parameters that need to be maintained in the transmission path and radio interface topology information in the transmission path, and the local-hop links are direct links of RNs from the UE to RNs in the transmission path and include an access link and the relay link in the transmission path;

an acquiring unit, configured to acquire, according to the QoS parameters that are received by the receiving unit and need to be acquired by the local-hop links, QoS parameters that need to be maintained by the local-hop links; and a scheduling unit, configured to make a scheduling decision on the local-hop links according to the QoS parameters that are acquired by the acquiring unit and need to be maintained by the local-hop links, to maintain QoS of a traffic flow corresponding to the QoS parameters.

An embodiment of the present invention further provides a system for maintaining QoS on a multi-hop network, where the system includes the base station and the relay node.

As can be known from the above technical solutions, the method, apparatus, and system for determining and maintaining QoS parameters on a multi-hop network according to embodiments of the present invention can achieve the following technical effects: In a data transmission process in a transmission path from a UE to a base station, when an actual transmission condition is changed, the base station may acquire statistics of a changed QoS parameter and calculate QoS parameters that need to be maintained by each link in the transmission path. In this way, the base station may timely determine QoS parameters that need to be maintained by each link in the transmission path from the base station to the UE. In addition, the base station may send the calculated QoS parameters that need to be maintained by each link to each RN, so that the RN can timely acquire QoS information needed for scheduling local-hop links to perform real-time maintenance on QoS of a traffic flow.

DETAILED DESCRIPTION OF THE EMBODIMENTS

The technical solutions provided in embodiments of the present invention are hereinafter described clearly and completely with reference to the accompanying drawings. Apparently, the embodiments to be described below are only a part of, rather than all of embodiments of the present invention. Other embodiments derived by persons of ordinary skill in the art from the embodiments given herein without making any creative effort should fall within the protection scope of the present invention.

Figure 1:
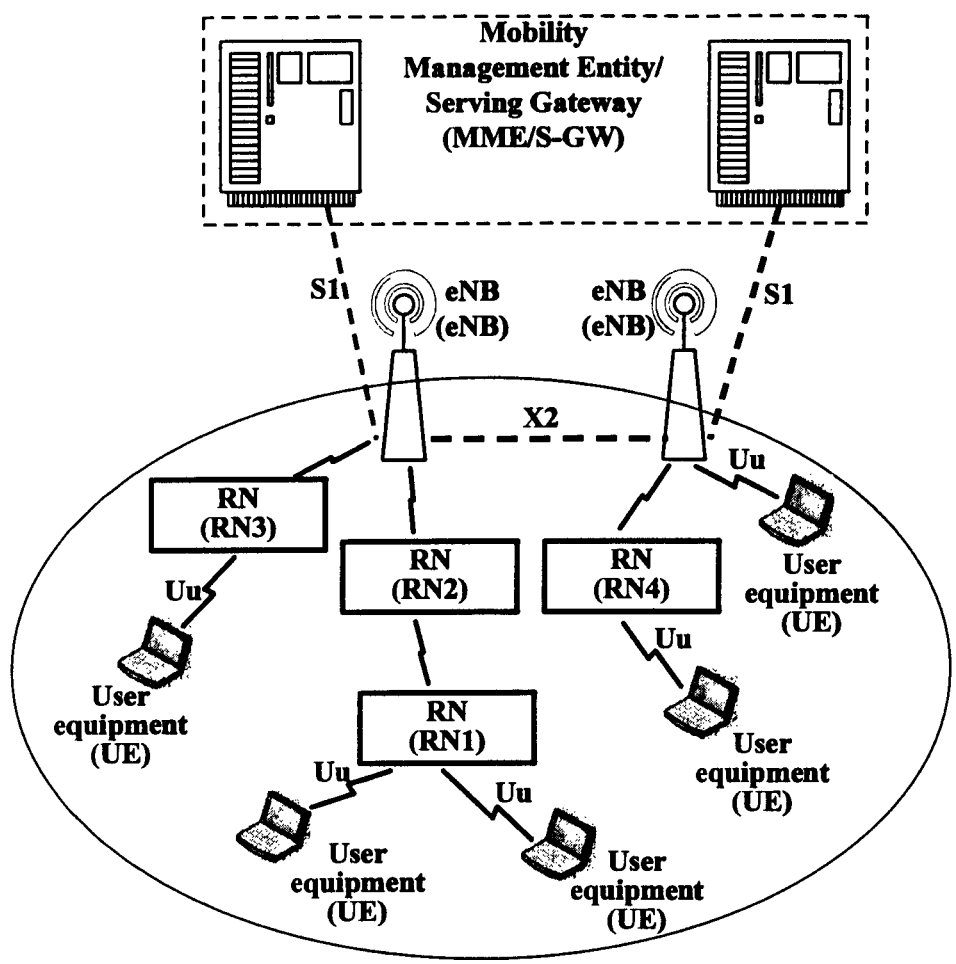
FIG. 1 is a schematic diagram of a network architecture after an RN is introduced into an LTE system according to an embodiment of the present invention.

FIG. 1 is a schematic diagram of a network architecture after an RN is introduced into an LTE system according to an embodiment of the present invention. As shown in FIG. 1, a UE may access an eNB through one or more RNs, for example, a UE1 accesses the eNB through an RN3, and a UE2 accesses the eNB through an RN1 and an RN2. In the embodiment of the present invention, a link between an eNB and an RN and a link between RNs are called relay links, and a link between an RN and a UE and a link between an eNB and a UE are called access links. RNs involved in the embodiment of the present invention have the following features: The RNs have the capability of scheduling UEs within the attaching range of the RNs.

In a distributed scheduling mode, assuming that a link between the UE and the eNB passes through two RNs, a link between the UE, the RN1, the RN2, and the eNB is represented by UE<—>RN1<—>RN2<—>eNB, where "<—>" is a double arrow, indicating a link between a left node of the double arrow and a right node of the double arrow. Through the link, the two nodes can exchange signaling and data information with each other. As shown in FIG. 1, the eNB is only responsible for scheduling and allocating resources in a last hop link RN2<—>eNB in the UE<—>eNB transmission path. The RN2 in the middle is responsible for scheduling and allocating resources in the RN1<—>RN2 link; the access RN1 is responsible for scheduling and allocating resources in the UE<—>RN1 link. The resource scheduling in each hop link should fully consider QoS requirements that need to be satisfied on an entire radio interface (that is, the transmission path from the UE to the eNB). In the embodiment of the present invention, a link undertaken by each node (including the RN and the eNB) is called a local-hop link. Therefore, in a distributed scheduling mode used to maintain QoS, the RN needs to make a scheduling decision on local-hop links according to QoS parameters that need to be maintained by the local-hop links undertaken by the RN, where the QoS parameters are one type of scheduling parameters that need to be acquired by the RN to make a scheduling decision on the local-hop links, that is, QoS parameters that need to be maintained by the local-hop links. Therefore, before the scheduling, the RN needs to acquire the QoS parameters that need to be maintained in the local-hop links undertaken by the RN, and then by using a scheduling mechanism in an LTE system, makes a scheduling decision according to the QoS parameters that need to be maintained by the local-hop links undertaken by the RN.

By using the method for maintaining QoS on a multi-hop network according to the embodiment of the present invention, through interactions between the RN and the eNB in a data transmission process, QoS parameters that need to be maintained by the link undertaken by the RN can be adjusted on a real-time basis, so that the QoS in the UE<—>eNB transmission path is maintained on a mutually coordinated basis.

Figure 2:
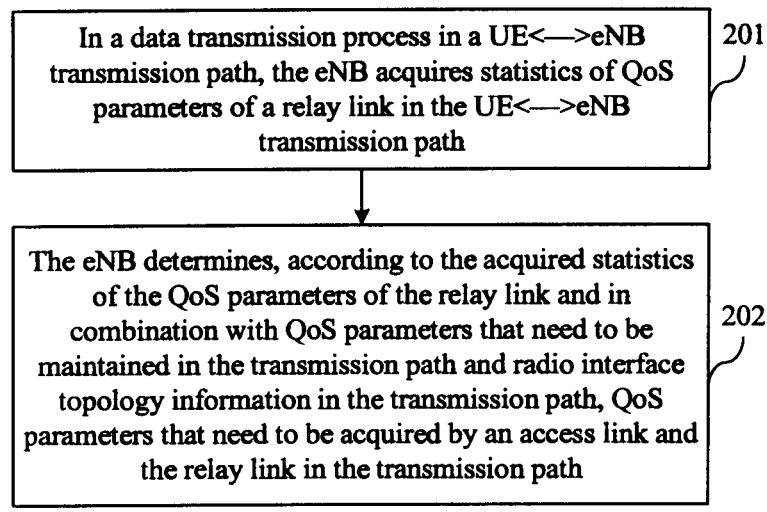
FIG. 2 is a schematic flowchart of an embodiment of a method for determining QoS parameters on a multi-hop network according to an embodiment of the present invention.

FIG. 2 is a schematic flowchart of a method for determining QoS parameters on a multi-hop network according to an embodiment of the present invention. It is assumed that a UE needs to pass through one or two RNs to access an eNB in combination with the network architecture shown in FIG. 1. As shown in FIG. 2, the method includes the following steps:

Step 201: In a data transmission process in a UE<—>eNB transmission path, the eNB acquires statistics of QoS parameters of a relay link in the UE<—>eNB transmission path, where the statistics of the QoS parameters of the relay link are statistics collected on changed QoS parameters in the relay link.

For example, the acquired statistics of the QoS parameters are statistics collected on multiple delay parameters changed in the relay link in a period of time.

Step 202: The eNB determines, according to the acquired statistics of the QoS parameters of the relay link and in combination with QoS parameters that need to be maintained in the transmission path and radio interface topology information in the transmission path, QoS parameters that need to be acquired by an access link and the relay link in the transmission path.

The statistics of the QoS parameters may be statistics of changed QoS parameters that are acquired when an actual transmission condition is changed in a data transmission process in the transmission link, for example, a delay statistics parameter. The QoS parameters that need to be acquired by the access link and relay link as determined by the eNB may be the QoS parameters that need to be maintained by the access link and the relay link, or may be QoS parameters that need to be maintained by other links other than the QoS parameters that need to be maintained by the access link and the relay link. The local-hop links are direct links of RNs from the UE to RNs and include an access link (UE<—>RN) and a relay link (RN<—>RN or RN<—>eNB). For example, in a transmission path UE<—>RN1<—>RN2<—>eNB from the UE to the eNB, the direct link of each RN may be as follows: The direct link of the RN2 is RN1<—>RN2, and the direct link of the RN1 is UE<—>RN1.

The scheduling decision means that a node that is responsible for scheduling a certain link controls and adjusts data transmission in the link by using parameters acquired by the node. The parameters that need to be considered in the scheduling include channel quality, QoS information, sleep cycle and measurement GAP of the UE, state information of a service, and system parameters (for example, system bandwidth). The embodiment of the present invention mainly describes how to acquire QoS information needed for scheduling the local-hop links on a real-time basis according to the change of the QoS parameters in a data transmission process.

It should be noted that the QoS parameters mentioned in this embodiment of the present invention are QoS parameters of a certain traffic flow. This also applies to the following embodiments, and repeated description is not provided hereunder.

By using the method for determining QoS parameters on a multi-hop network according to this embodiment, in a data transmission process in a transmission path from a UE to an eNB, when an actual transmission condition is changed, the eNB may acquire statistics of a changed QoS parameter and calculate QoS parameters that need to be maintained by each link in the transmission path. In this way, the eNB may determine QoS parameters that need to be maintained by each link in the transmission path from the eNB to the UE on a real-time basis.

In the above embodiment, in step 202, the determining the QoS parameters that need to be acquired by the access link and the relay link may further include: sending, by the eNB, the QoS parameters that need to be acquired by the access link and the relay link to each RN that is responsible for scheduling the access link and the relay link, so that the RN can perform scheduling by using updated QoS parameters on a real-time basis.

Figure 3:
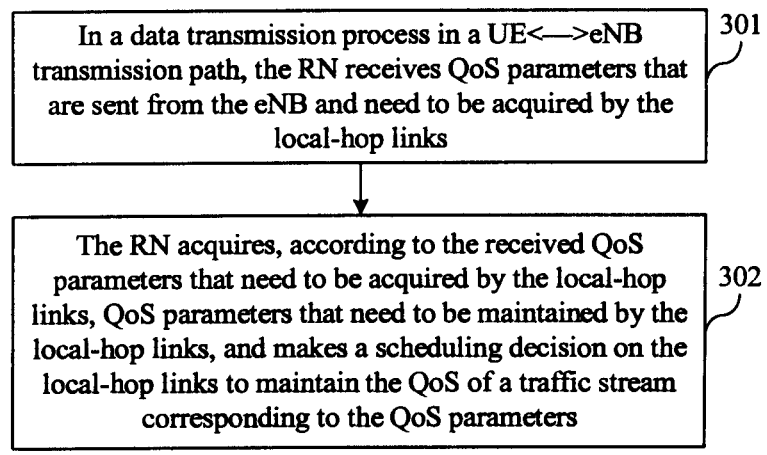
FIG. 3 is a schematic flowchart of an embodiment of a method for maintaining QoS on a multi-hop network according to an embodiment of the present invention.

FIG. 3 is a schematic flowchart of a method for maintaining QoS on a multi-hop network according to an embodiment of the present invention. From the perspective of an RN, corresponding to the method for determining QoS parameters on a multi-hop network, the method for maintaining QoS on a multi-hop network, as shown in FIG. 3, includes the following steps:

Step 301: In a data transmission process in a UE<—>eNB transmission path, the RN receives QoS parameters that are sent from the eNB and need to be acquired by local-hop links.

The QoS parameters that need to be acquired by the local-hop links are determined by the eNB according to acquired statistics of QoS parameters of a relay link in the UE<—>eNB transmission path and in combination with the QoS parameters that need to be maintained in the transmission path and radio interface topology information in the transmission path. The local-hop links are direct links of RNs from the UE to RNs in the UE<—>eNB transmission path, and may include an access link (UE<—>RN) and a relay link (RN<—>RN or RN<—>eNB).

Step 302: The RN acquires, according to the received QoS parameters that need to be acquired by the local-hop links, QoS parameters that need to be maintained by the local-hop links, and makes a scheduling decision on the local-hop links to maintain the QoS of a traffic flow corresponding to the QoS parameters.

By using the method for maintaining QoS on a multi-hop network according to this embodiment, in a data transmission process in a transmission path from a UE to an eNB, when an actual transmission condition is changed, the eNB may acquire statistics of a changed QoS parameter, calculate QoS parameters that need to be maintained by each link in the transmission path, and deliver the calculated QoS parameters that need to be maintained by each link to each RN. In this way, the RN can acquire QoS information needed for scheduling local-hop links on a real-time basis, and perform real-time maintenance on the QoS of a traffic flow.

The technical solutions provided in the foregoing embodiments are described in detail in the following four scenarios. The four scenarios include: two-hop downlink distributed scheduling process, two-hop uplink distributed scheduling process, multi-hop downlink distributed scheduling process, and multi-hop uplink distributed scheduling process. The multi-hop process is exemplified by three hops.

Figure 4:
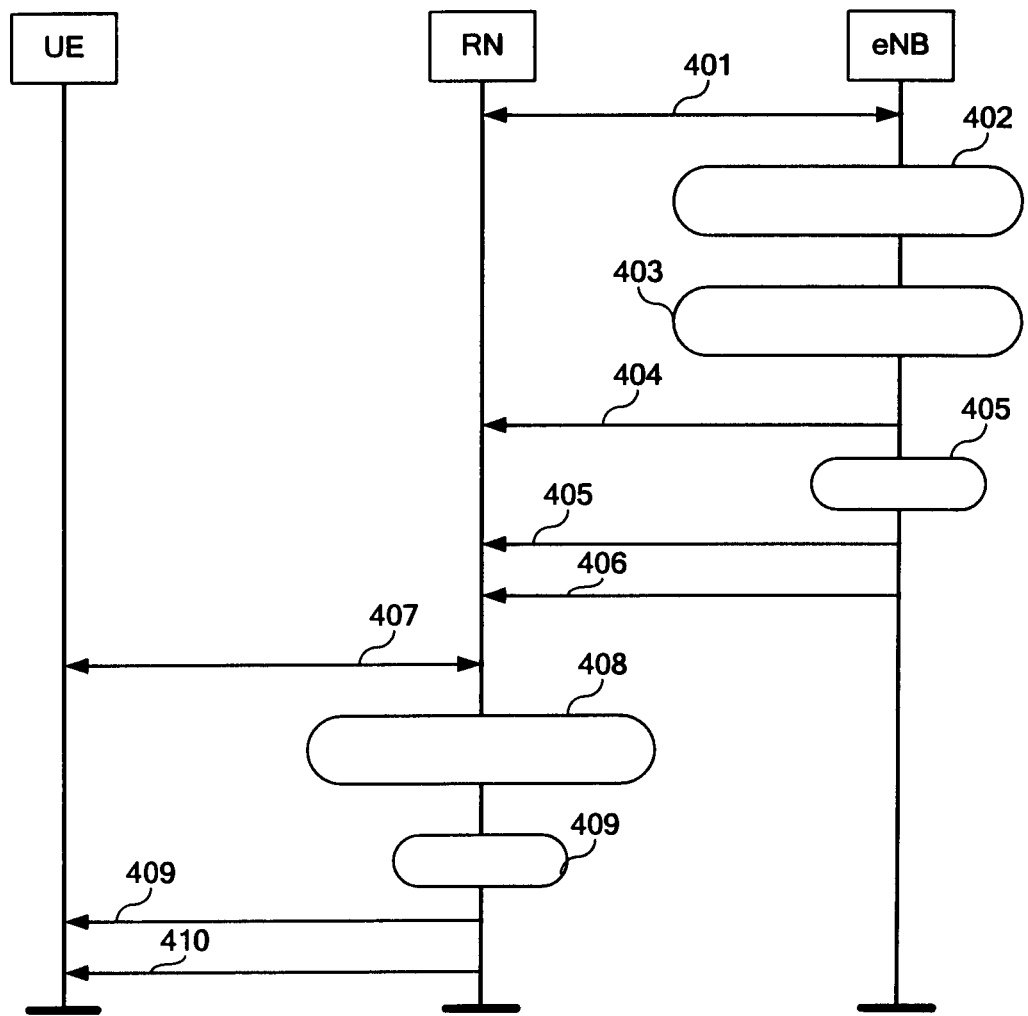
FIG. 4 is a signaling flowchart of a two-hop downlink distributed scheduling process according to an embodiment of the present invention.

FIG. 4 is a signaling flowchart of a two-hop downlink distributed scheduling process according to an embodiment of the present invention. In a data transmission process, the following steps may be executed only when an actual transmission condition is changed and QoS parameters that need to be maintained by a certain hop link need to be re-calculated. Otherwise, an RN that is responsible for scheduling each hop link still schedules local-hop links by using QoS parameters previously allocated. As shown in FIG. 4, the following steps are included:

Step 401: An RN measures a reference signal (Reference Signal, RS for short) sent from an eNB, and feeds back a measurement result through an uplink channel to the eNB by using a channel quality indicator (Channel Quality Indicator, CQI for short) at a next moment.

Step 402: The eNB acquires statistics of QoS parameters of a relay link (eNB—>RN) in an eNB—>UE transmission path.

In step 402, the eNB acquires the statistics of the QoS parameters of a direct relay link in the transmission path, where the direct relay link is a direct relay link eNB—>RN between the eNB and the RN. "—>" is a one-way arrow, indicating a one-way link through which a left node of the one-way arrow sends a signaling message and data information to a right node of the one-way arrow.

In the data transmission process in this embodiment, data is delivered from the eNB to the RN, and then the RN may return a response message to the eNB. In this way, the eNB may acquire statistics of QoS parameters in the eNB—>RN link when the eNB delivers data to the RN before the transmission. In this embodiment, the statistics of the QoS parameters are exemplified by a downlink delay statistics parameter.

Step 403: The eNB determines, according to the acquired downlink delay statistics parameter and in combination with QoS parameters that need to be maintained in the transmission path and radio interface topology information in the transmission path, QoS parameters that need to be acquired by the access link (RN—>UE) and the eNB—>RN link.

The QoS parameters (delay parameters in this embodiment) that need to be acquired by the RN—>UE link and the eNB—>RN link include: delay parameters that need to be maintained by the RN—>UE link and the eNB—>RN link; or delay parameters, which need to be acquired by the RN—>UE link, that need to be maintained by another relay link, that is, the eNB—>RN link, other than the delay parameters that need to be maintained by the RN—>UE link, and delay parameters, which need to be acquired by the eNB—>RN link, that need to be maintained by the RN—>UE link other than the delay parameters that need to be maintained by the eNB—>RN link.

Step 404: The eNB sends the QoS parameters that need to be acquired by the RN—>UE link to the RN that is responsible for scheduling the RN—>UE link.

In this embodiment, the eNB—>RN link is scheduled by the eNB. Therefore, the eNB only needs to send the QoS parameters that need to be acquired by the RN—>UE link scheduled by the RN to the RN. In addition, the sending process may be implemented in a bearer update process, that is, the eNB sends, in a periodic or an event-triggered manner, QoS parameters that need to be acquired by the RN—>UE link to the RN that is responsible for scheduling the RN—>UE link, where the QoS parameters that need to be acquired by the RN—>UE link may be carried in a radio resource control (Radio Resource Control, RRC for short) message. The event trigger may occur when the collected change of a downlink delay statistics parameter reaches a threshold.

Step 405: The eNB makes a scheduling decision according to the QoS parameters that need to be maintained by the eNB—>RN link as determined in step 403 and in combination with other scheduling parameters.

In step 405, the eNB indicates available downlink shared channel (DL Shared Channel, DL-SCH for short) resources, modulation and coding schemes, antenna selection schemes and the like to the RN through a downlink link assignment (Down Link assignment) message.

Step 406: The eNB sends downlink data to the RN.

Step 407: The UE measures an RS sent from the RN, and feeds back a measurement result through an uplink channel to the RN by using a CQI at a next moment.

Step 408: According to the QoS parameters that need to be acquired by a local-hop link, that is, the RN—>UE link, and are acquired from the eNB in step 404, the RN acquires the QoS parameters that need to be maintained by the local-hop link.

In step 408, the QoS parameters acquired from the eNB may be the QoS parameters that need to be maintained by the local-hop link, or may be QoS parameters that need to be maintained by other links other than the local-hop link.

In this embodiment, if the QoS parameters acquired from the eNB are the QoS parameters that need to be maintained by other links other than the local-hop link, that is, the QoS parameters that need to be maintained by the eNB—>RN link, the RN also needs to calculate, according to the received QoS parameters that need to be maintained by other links, QoS parameters that need to be maintained in the transmission path, and radio interface topology information in the transmission path, QoS parameters that need to be maintained by the local-hop link.

Step 409: The RN makes a scheduling decision according to the acquired QoS parameters that need to be maintained by the local-hop link and in combination with other various scheduling parameters to maintain the QoS of a traffic flow in the RN—>UE link.

The RN indicates available DL-SCH resources, modulation and coding schemes, antenna selection schemes and the like to the UE through a downlink assignment message.

Step 410: The RN sends downlink data to the UE.

By using the two-hop downlink distributed scheduling process provided in this embodiment, an eNB determines, according to acquired statistics of QoS parameters, QoS parameters that need to be maintained by an access link scheduled by an RN, and sends the determined QoS parameters to the RN before a next scheduling decision is made in a data transmission process, so that the RN adjusts scheduling parameters of the access link on a real-time basis.

Figure 5:
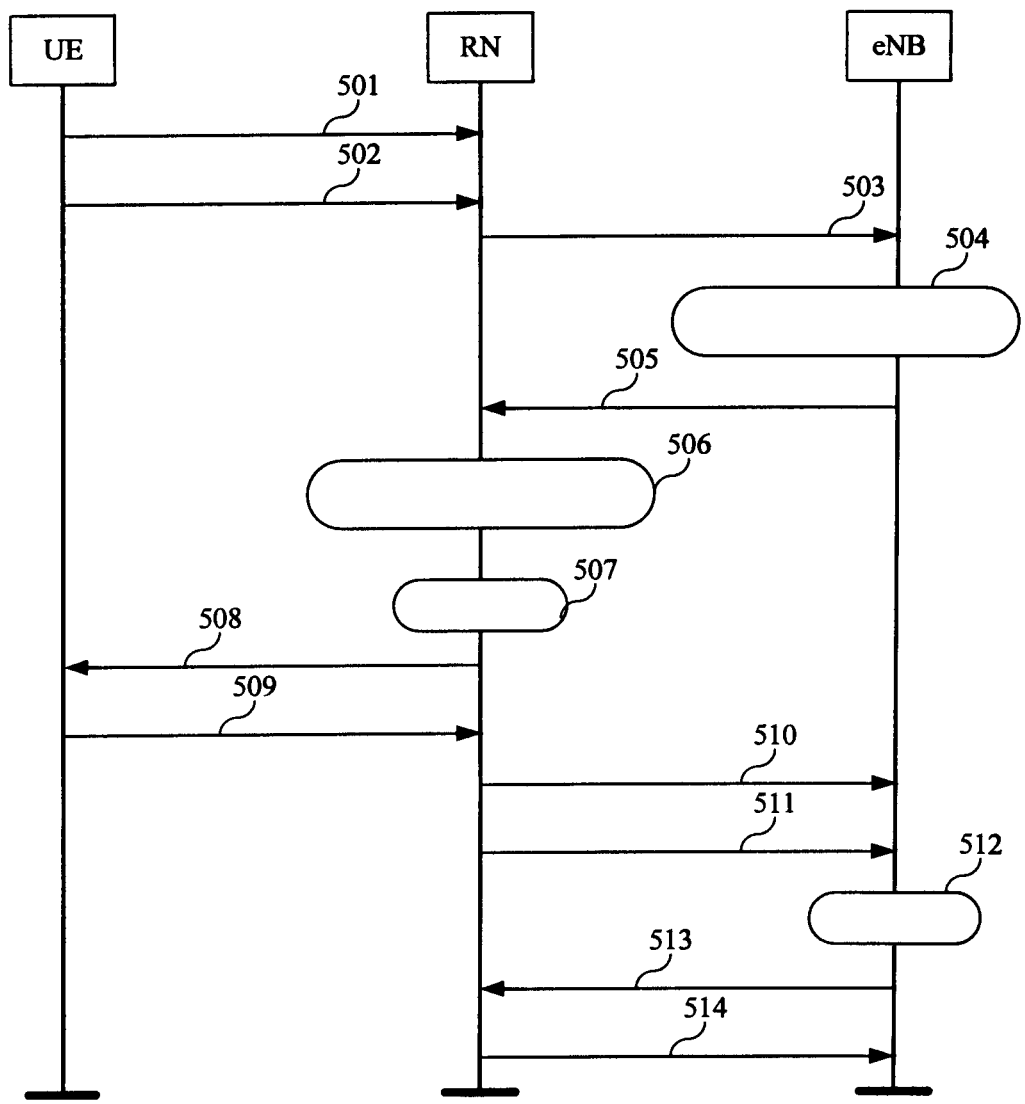
FIG. 5 is a signaling flowchart of a two-hop uplink distributed scheduling process according to an embodiment of the present invention.

FIG. 5 is a signaling flowchart of a two-hop uplink distributed scheduling process according to an embodiment of the present invention. As shown in FIG. 5, the two-hop uplink distributed scheduling process includes the following steps:

Step 501: An RN measures an RS sent from a UE to acquire the status of an uplink channel, and also needs to receive a buffer status report (Buffer Status Report, BSR for short) sent from the UE to acquire the current traffic information reported by the UE.

Step 502: In the case of dynamic scheduling, the UE also needs to send a schedule request (Schedule Request, SR for short) message to the RN each time when the UE needs to send data, where the message is used to acquire uplink shared channel (UL-SCH) resources.

Step 503: The RN reports statistics of QoS parameters of a relay link (RN—>eNB) in a transmission path to the eNB in a periodic or an event-triggered manner.

In this embodiment, before the RN makes a current scheduling decision and performs data transmission on an access link (UE—>RN), if an actual transmission condition is changed, the RN may report the statistics of the QoS parameters of the RN—>eNB link to the eNB before the scheduling decision is made, where the statistics of the QoS parameters of the RN—>eNB link are acquired by the RN. The reporting process is triggered periodically or through an event, that is, the reporting may not be necessarily performed in step 503, and can be performed at any moment before the scheduling decision is made. In this embodiment, the reporting being performed in step 503 is only taken for example. The event trigger may occur, for example, when the statistics of the QoS parameters of the RN—>eNB link that are acquired by the RN exceed a threshold. The reported statistics of the QoS parameters of the RN—>eNB link may be carried in an RRC message in a bearer update process to be reported. The statistics of the QoS parameters in this embodiment are exemplified by an uplink delay statistics parameter.

Step 504: After the eNB receives the uplink delay statistics parameter that is of the RN—>eNB link in the UE—>eNB transmission path and is reported by the RN, the eNB determines, according to the acquired uplink delay statistics parameter and in combination with QoS parameters that need to be maintained in the transmission path and radio interface topology information in the transmission path, QoS parameters that need to be acquired by the UE—>RN link and the RN—>eNB link.

The QoS parameters (delay parameters in this embodiment) that need to be acquired by the UE—>RN link and the RN—>eNB link include: delay parameters that need to be maintained by the UE—>RN link and the RN—>eNB link; or delay parameters, which need to be acquired by the UE—>RN link, that need to be maintained by the RN—>eNB link other than the delay parameters that need to be maintained by the UE—>RN link, and delay parameters, which need to be acquired by the RN—>eNB link, that need to be maintained by the UE—>RN link and the RN—>eNB link other than the delay parameters that need to be maintained by the RN—>eNB link.

Step 505: The eNB sends the QoS parameters that need to be acquired by the UE—>RN link to the RN that is responsible for scheduling the UE—>RN link.

In this embodiment, the RN—>eNB link is scheduled by the eNB. Therefore, the eNB only needs to send the QoS parameters that need to be acquired by the UE—>RN link scheduled by the RN to the RN. In addition, the sending process may be implemented in a bearer update process, that is, the eNB sends, in a periodic or an event-triggered manner, QoS parameters that need to be acquired by an access link to an RN that is responsible for scheduling the access link, where the QoS parameters that need to be acquired by the access link may be carried in an RRC message. The event trigger may occur when the collected change of a received uplink delay statistics parameter reaches a threshold.

Step 506: According to the QoS parameters that need to be acquired by a local-hop link, that is, the UE—>RN link, and are acquired by the RN from the eNB, the RN acquires the QoS parameters that need to be maintained by the local-hop link.

In step 506, the QoS parameters acquired from the eNB may be the QoS parameters that need to be maintained by the local-hop link, or may be the QoS parameters that need to be maintained by other links other than the local-hop link.

In this embodiment, if the QoS parameters acquired from the eNB are the QoS parameters that need to be maintained by other links other than the local-hop link, that is, the QoS parameters that need to be maintained by the eNB—>RN link, the RN also needs to calculate, according to received QoS parameters that need to be maintained by other links, QoS parameters that need to be maintained in the transmission path, and radio interface topology information in the transmission path, QoS parameters that need to be maintained by the local-hop link.

Step 507: The RN makes a scheduling decision according to the QoS parameters that are acquired by the RN and need to be maintained by the local-hop link and in combination with other scheduling parameters.

Step 508: The RN indicates available DL-SCH resources, modulation and coding schemes, antenna selection schemes and the like to the UE through an uplink grant (UL grant).

Step 509: The UE sends uplink data to the RN.

Step 510: The eNB measures an RS sent from the RN to acquire the status of an uplink channel, and also needs to receive a BSR sent from the RN to acquire the current traffic information reported by the RN.

Step 511: In the case of dynamic scheduling, the RN also needs to send an SR message to the eNB each time when the RN needs to send data, where the message is used to acquire UL-SCH resources.

Step 512: The eNB makes a scheduling decision according to the determined QoS parameters that need to be maintained by the local-hop link, that is, the RN—>eNB link, and in combination with other scheduling parameters.

Step 513: The eNB indicates available UL-SCH resources, modulation and coding schemes, antenna selection schemes and the like to the RN through an uplink grant (UL grant).

Step 514: The RN sends uplink data to the eNB.

By using the two-hop uplink distributed scheduling process provided in this embodiment, an eNB determines, according to acquired statistics of QoS parameters, QoS parameters that need to be maintained by an access link scheduled by an RN, and sends the determined QoS parameters to the RN before a next scheduling decision is made in a data transmission process, so that the RN adjusts scheduling parameters of the access link on a real-time basis.

Figure 6:
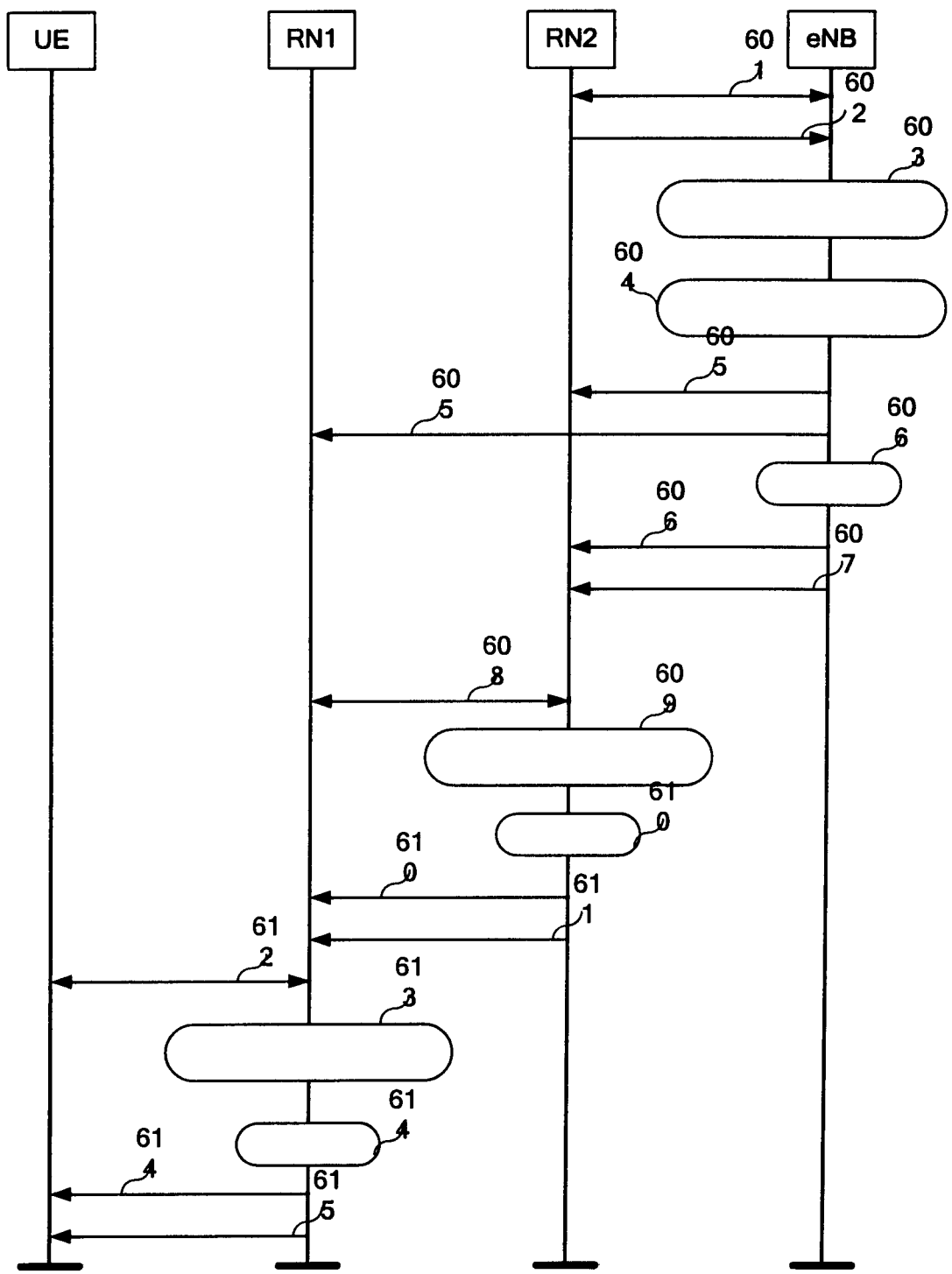
FIG. 6 is a signaling flowchart of a three-hop downlink distributed scheduling process according to an embodiment of the present invention.

FIG. 6 is a signaling flowchart of a three-hop downlink distributed scheduling process according to an embodiment of the present invention. In a data transmission process, the following steps may be executed only when an actual transmission condition is changed and QoS parameters that need to be maintained by a certain hop link need to be re-calculated. Otherwise, an RN responsible for scheduling each hop link still schedules local-hop links by using QoS parameters previously allocated. As shown in FIG. 6, the following steps are included:

Step 601: An RN2 measures an RS sent from an eNB, and feeds back a measurement result through an uplink channel to the eNB by using a CQI at a next moment.

Step 602: The RN2 reports statistics of QoS parameters of a relay link (RN2—>RN1) in a transmission path to the eNB in a periodic or an event-triggered manner.

In this embodiment, before the eNB makes a scheduling decision and performs data transmission on the eNB—>RN2 link, if the actual transmission condition is changed, the RN2 may report the statistics of the QoS parameters of the RN2—>RN1 link to the eNB before the scheduling decision is made, where the statistics of the QoS parameters of the RN2—>RN1 link are acquired by the RN2. This reporting process is triggered periodically or through an event, that is, this reporting may not necessarily be performed in step 602, and can be performed at any moment before the scheduling decision is made. In this embodiment, the reporting being performed in step 602 is only taken for example. The event trigger may occur, for example, when the statistics of the QoS parameters of the RN2—>RN1 link that are acquired by the RN2 exceed a threshold. The reported statistics of the QoS parameters of the RN2—>RN1 link may be carried in an RRC message in a bearer update process to be reported. The statistics of the QoS parameters in this embodiment are exemplified by a downlink delay statistics parameter.

Step 603: The eNB acquires downlink delay statistics parameters of relay links (eNB—>RN2 and RN2—>RN1) in an eNB—>UE transmission path.

In step 603, the eNB acquires a downlink delay statistics parameter of a direct relay link (eNB—>RN2) in the transmission path, where the direct relay link is a direct relay link from the eNB to the RN2, and receives a downlink delay statistics parameter of the RN2—>RN1 link reported by the RN2 that is responsible for scheduling another relay link, that is, the RN2—>RN1 link, where the another relay link is a relay link other than the direct relay link.

Step 604: The eNB determines, according to the acquired downlink delay statistics parameters of the eNB—>RN2 link and the RN2—>RN1 link and in combination with QoS parameters that need to be maintained in the transmission path and radio interface topology information in the transmission path, QoS parameters that need to be acquired by the access link (RN1—>UE), RN2—>RN1 link, and eNB—>RN2 link.

The QoS parameters (delay parameters in this embodiment) that need to be acquired by the RN1—>UE link, RN2—>RN1 link, and eNB—>RN2 link include: delay parameters that need to be maintained by the RN1—>UE link, RN2—>RN1 link, and eNB—>RN2 link; or delay parameters, which need to be acquired by the RN1—>UE link, that need to be maintained by other relay links, that is, the RN2—>RN1 link and the eNB—>RN2 link, other than the delay parameters that needs to be maintained by the RN1—>UE link; delay parameters, which need to be acquired by the RN2—>RN1 link, that need to be maintained by the RN1—>UE link and eNB—>RN2 link other than the delay parameters that need to be maintained by the RN2—>RN1 link; and delay parameters, which need to be acquired by the eNB—>RN2 link, that need to be maintained by the RN1—>UE link and the RN2—>RN1 link other than the delay parameters that need to be maintained by the eNB—>RN2 link.

Step 605: The eNB sends the QoS parameters that are acquired by the RN2—>RN1 link to the RN2 responsible for scheduling the RN2—>RN1 link, and sends the QoS parameters that need to be acquired by the RN1—>UE link to the RN1 responsible for scheduling the RN1—>UE link.

In this embodiment, the eNB—>RN2 link is scheduled by the eNB. Therefore, the eNB only needs to send the QoS parameters that need to be acquired by the RN2—>RN1 link scheduled by the RN2 to the RN2, and send the QoS parameters that need to be acquired by the RN1—>UE link scheduled by the RN1 to the RN1. In addition, the sending process may be implemented in a bearer update process, that is, the eNB sends, in a periodic or an event-triggered manner, QoS parameters that need to be acquired by the RN2—>RN1 link and the RN1—>UE link to the RN2 and the RN1 responsible for the scheduling, where the QoS parameters may be carried in an RRC message. The event trigger may occur when the collected change of the downlink delay statistics parameter reaches a threshold.

Step 606: The eNB makes a scheduling decision according to the QoS parameters that need to be maintained by the eNB—>RN2 link as determined in step 604 and in combination with other scheduling parameters.

In step 606, the eNB indicates available DL-SCH resources, modulation and coding schemes, antenna selection schemes and the like to the RN2 through a downlink assignment (Down Link assignment) message.

Step 607: The eNB sends downlink data to the RN2.

Step 608: The RN1 measures an RS sent from the RN2, and feeds back a measurement result through an uplink channel to the RN2 by using a CQI at a next moment.

Step 609: According to QoS parameters that need to be acquired by a local-hop link, that is, the RN2—>RN1 link and are acquired from the eNB in step 605, the RN2 acquires the QoS parameters that need to be maintained by the local-hop link.

In step 609, the QoS parameters acquired from the eNB may be the QoS parameters that need to be maintained by the local-hop link, or may be the QoS parameters that need to be maintained by other links other than the local-hop link.

In this embodiment, if the QoS parameters acquired from the eNB are the QoS parameters that need to be maintained by other links other than the local-hop link, that is, the QoS parameters that need to be maintained by the eNB—>RN2 link and the RN1—>UE link, the RN also needs to calculate, according to received QoS parameters that need to be maintained by other links, QoS parameters that need to be maintained in the transmission path, and radio interface topology information in the transmission path, QoS parameters that need to be maintained by the local-hop link.

Step 610: The RN2 makes a scheduling decision according to the acquired QoS parameters that need to be maintained by the local-hop link and in combination with other various scheduling parameters to maintain the QoS of a traffic flow in an access link.

The RN2 indicates available DL-SCH resources, modulation and coding schemes, antenna selection schemes and the like to the RN1 through a downlink assignment message.

Step 611: The RN2 sends downlink data to the RN1.

Step 612: The UE measures an RS sent from the RN1, and feeds back a measurement result through an uplink channel to the RN1 by using a CQI at a next moment.

Step 613: According to the QoS parameters that need to be acquired by a local-hop link, that is, the RN1—>UE link and are acquired from the eNB in step 605, the RN1 acquires the QoS parameters that need to be maintained by the local-hop link.

In step 613, the QoS parameters acquired from the eNB may be the QoS parameters that need to be maintained by the local-hop link, or may be the QoS parameters that need to be maintained by other links other than the local-hop link.

In this embodiment, if the QoS parameters acquired from the eNB are the QoS parameters that need to be maintained by other links other than the local-hop link, that is, the QoS parameters that need to be maintained by the eNB—>RN2 link and the RN2—>RN1 link, the RN1 also needs to calculate, according to received QoS parameters that need to be maintained by other links, QoS parameters that need to be maintained in the transmission path, and radio interface topology information in the transmission path, QoS parameters that need to be maintained by the local-hop link.

Step 614: The RN1 makes a scheduling decision according to the acquired QoS parameters that need to be maintained by the local-hop link and in combination with other various scheduling parameters to maintain the QoS of a traffic flow in an access link.

The RN1 indicates available DL-SCH resources, modulation and coding schemes, antenna selection schemes and the like to the UE through a downlink assignment message.

Step 615: The RN1 sends downlink data to the UE.

By using the multi-hop downlink distributed scheduling process provided in this embodiment, an eNB determines, according to acquired statistics of QoS parameters, QoS parameters that need to be maintained by access links scheduled by an RN1 and an RN2, and sends the determined QoS parameters to the RN1 and RN2 before a next scheduling decision is made in the data transmission process, so that the RN1 and the RN2 adjust scheduling parameters of links undertaken by the RN1 and the RN2 on a real-time basis.

Figure 7:
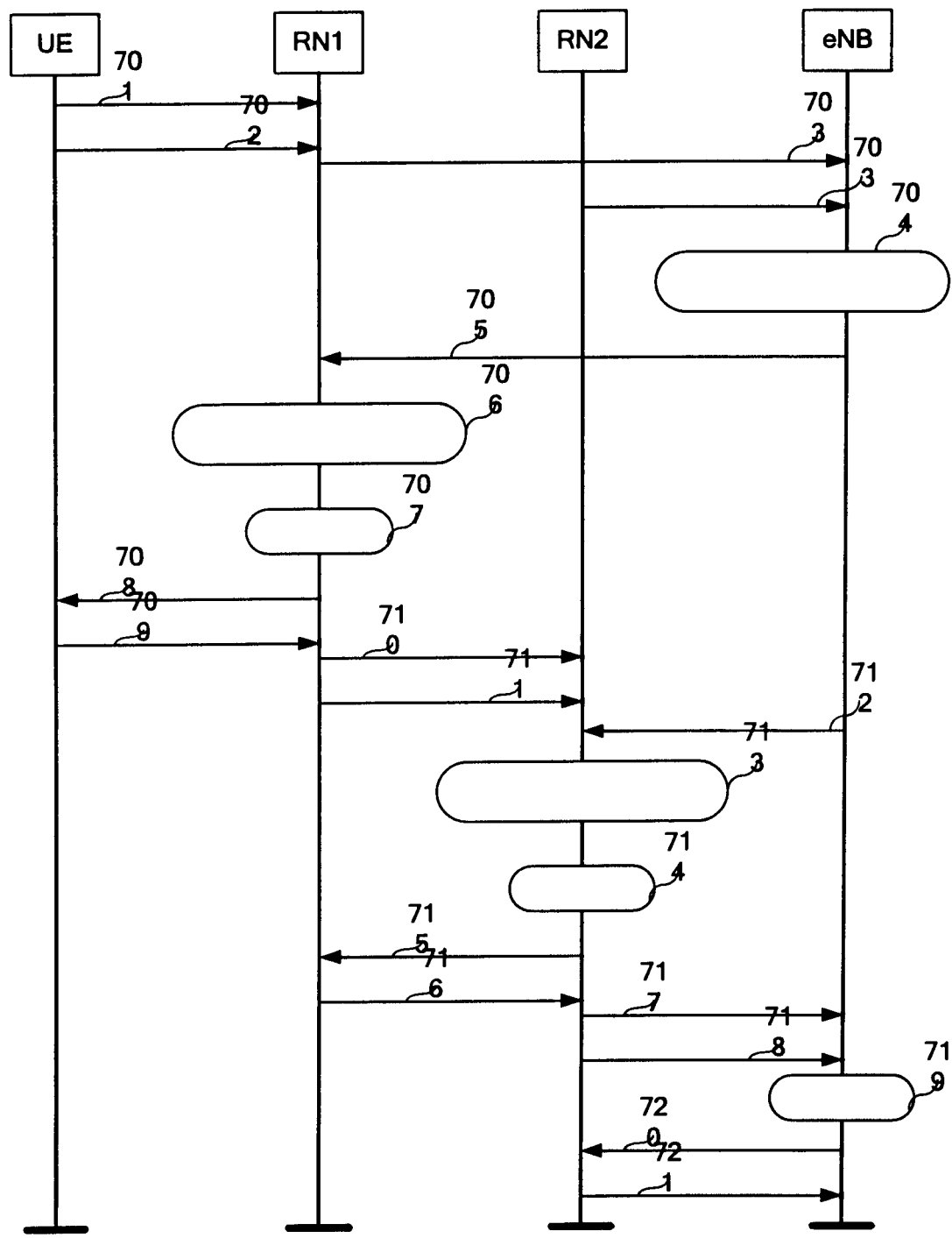
FIG. 7 is a signaling flowchart of a three-hop uplink distributed scheduling process according to an embodiment of the present invention.

FIG. 7 is a signaling flowchart of a three-hop uplink distributed scheduling process according to an embodiment of the present invention. As shown in FIG. 7, the following steps are included:

Step 701: An RN1 measures an RS sent from a UE to acquire the status of an uplink channel, and also needs to receive a BSR sent from the UE to acquire the current traffic information reported by the UE.

Step 702: In the case of dynamic scheduling, the UE also needs to send an SR message to the RN1 each time when the UE need to send data, where the message is used to acquire UL-SCH resources.

Step 703: An RN1 and an RN2 report statistics of QoS parameters of relay links (the RN1—>RN2 link and the RN2—>eNB link) in a transmission path to the eNB in a periodic or an event-triggered manner.

In this embodiment, before the RN1 makes a scheduling decision and performs data transmission on an access link (UE—>RN1), if an actual transmission condition is changed, the RN1 and the RN2 may report the statistics of the QoS parameters of the RN1—>RN2 link and the RN2—>eNB link to the eNB before the scheduling decision is made, where the statistics of the QoS parameters of the RN1—>RN2 link and the RN2—>eNB link are acquired by the RN1 and the RN2 respectively. This reporting process is triggered periodically or through an event, that is, this reporting may not necessarily be performed in step 703, and can be performed at any moment before the scheduling decision is made. In this embodiment, the reporting being performed in step 703 is only taken for example. The event trigger may occur, for example, when the statistics of the QoS parameters of the RN2—>eNB link that are acquired by the RN2 exceed a threshold. The reported statistics of the QoS parameters of the RN1—>RN2 link and the RN2—>eNB link may be carried in an RRC message in a bearer update process to be reported. The statistics of the QoS parameters in this embodiment are exemplified by an uplink delay statistics parameter.

Step 704: After the eNB receives the uplink delay statistics parameters of the RN1—>RN2 link and the RN2—>eNB link reported by the RN1 and the RN2 in a UE—>eNB transmission path, the eNB determines, according to the acquired uplink delay statistics parameters and in combination with QoS parameters that need to be maintained in the transmission path and radio interface topology information in the transmission path, QoS parameters that need to be acquired by the UE—>RN1 link, the RN1—>RN2 link, and the RN2—>eNB link.

The QoS parameters (delay parameters in this embodiment) that need to be acquired by the UE—>RN1 link, RN1—>RN2 link, and RN2—>eNB link include: delay parameters that need to be maintained by the UE—>RN1 link, RN1—>RN2 link, and RN2—>eNB link; or delay parameters, which need to be acquired by the UE—>RN1, that need to be maintained by the RN1—>RN2 link and the RN2—>eNB link other than the delay parameters that need to be maintained by the UE—>RN1 link; delay parameters, which need to be acquired by the RN1—>RN2 link, that need to be maintained by the UE—>RN1 link and the RN2—>eNB link other than the delay parameters that need to be maintained by the RN1—>RN2 link; and delay parameters, which need to be acquired by the RN2—>eNB link, that need to be maintained by the UE—>RN1 link and the RN1—>RN2 link other than the delay parameters that need to be maintained by the RN2—>eNB link.

Step 705: The eNB sends the QoS parameters that need to be acquired by the UE—>RN1 link to the RN1 responsible for scheduling the UE—>RN1 link.

The sending process may be implemented in a bearer update process, that is, the eNB sends, in a periodic or an event-triggered manner, QoS parameters that need to be acquired by the UE—>RN1 link to the RN1 responsible for scheduling the UE—>RN1 link, where the QoS parameters that need to be acquired by the UE—>RN1 link may be carried in an RRC message. The event trigger may occur when the collected change of a received uplink delay statistics parameter reaches a threshold.

Step 706: According to the QoS parameters that need to be acquired by a local-hop link, that is, the UE—>RN1 link and are acquired by the RN1 from the eNB, the RN1 acquires the QoS parameters that need to be maintained by the local-hop link.

In step 706, the QoS parameters acquired from the eNB may be the QoS parameters that need to be maintained by the local-hop link, or may be the QoS parameters that need to be maintained by other links other than the local-hop link.

In this embodiment, if the QoS parameters acquired from the eNB are the QoS parameters that need to be maintained by other links other than the local-hop link, that is, the QoS parameters that need to be maintained by the RN1—>RN2 link and the RN2—>eNB link, the RN1 also needs to calculate, according to received QoS parameters that need to be maintained by other links, QoS parameters that need to be maintained in the transmission path, and radio interface topology information in the transmission path, QoS parameters that need to be maintained by the local-hop link.

Step 707: The RN1 makes a scheduling decision according to the QoS parameters that are acquired by the RN1 and need to be maintained by the local-hop link and in combination with other scheduling parameters.

Step 708: The RN1 indicates available DL-SCH resources, modulation and coding schemes, antenna selection schemes and the like to the UE through an uplink grant (UL grant).

Step 709: The UE sends uplink data to the RN1.

Step 710: The RN2 measures an RS sent from the RN1 to acquire the status of an uplink channel, and also needs to receive a BSR sent from the RN1 to acquire the current traffic information reported by the RN1.

Step 711: In the case of dynamic scheduling, the RN1 also needs to send an SR message to the RN2 each time when the RN needs to send data, where the message is used to acquire UL-SCH resources.

Step 712: The eNB sends the QoS parameters that need to be acquired by the RN1—>RN2 link to the RN2 responsible for scheduling the RN1—>RN2 link.

The sending process may be implemented in a bearer update process, that is, the eNB sends, in a periodic or an event-triggered manner, QoS parameters that need to be acquired by the RN1—>RN2 link to the RN2 responsible for scheduling the RN1—>RN2 link, where the QoS parameters that need to be acquired by the RN1—>RN2 link may be carried in an RRC message. The event trigger may occur when the collected change of a received uplink delay statistics parameter reaches a threshold.

Step 713: According to the QoS parameters that need to be acquired by a local-hop link, that is, the RN1—>RN2 link and are acquired by the RN2 from the eNB, the RN2 acquires the QoS parameters that need to be maintained by the local-hop link In step 713, the QoS parameters acquired from the eNB may be the QoS parameters that need to be maintained by the local-hop link, or may be the QoS parameters that need to be maintained by other links other than the local-hop link.

In this embodiment, if the QoS parameters acquired from the eNB are the QoS parameters that need to be maintained by other links other than the local-hop link, that is, the QoS parameters that need to be maintained by the UE—>RN1 link and the RN2—>eNB link, the RN2 also needs to calculate, according to received QoS parameters that need to be maintained by other links, QoS parameters that need to be maintained in the transmission path, and radio interface topology information in the transmission path, QoS parameters that need to be maintained by the local-hop link.

Step 714: The RN2 makes a scheduling decision according to the acquired QoS parameters that need to be maintained by the local-hop link and in combination with other scheduling parameters.

Step 715: The RN2 indicates available UL-SCH resources, modulation and coding schemes, antenna selection schemes and the like to the RN1 through an uplink grant (UL grant).

Step 716: The RN1 sends uplink data to the RN2.

Step 717: The eNB measures an RS sent from the RN2 to acquire the status of an uplink channel, and also needs to receive a BSR sent from the RN2 to acquire the current traffic information reported by the RN2.

Step 718: In the case of dynamic scheduling, the RN2 also needs to send an SR message to the eNB each time when the RN2 needs to send data, where the message is used to acquire UL-SCH resources.

Step 719: The eNB makes a scheduling decision according to the QoS parameters that are determined by the eNB and need to be maintained by the local-hop link, that is, the RN2—>eNB link, and in combination with other scheduling parameters.

Step 720: The eNB indicates available UL-SCH resources, modulation and coding schemes, antenna selection schemes and the like to the RN2 through an uplink grant (UL grant).

Step 721: The RN2 sends uplink data to the eNB.

By using the multi-hop uplink distributed scheduling process provided in this embodiment, an eNB determines, according to acquired statistics of QoS parameters, QoS parameters that need to be maintained by access links scheduled by an RN1 and an RN2, and sends the determined QoS parameters to the RN1 and RN2 before a next scheduling decision is made in a data transmission process, so that the RN1 and the RN2 adjust scheduling parameters of access links on a real-time basis.

For how the eNB calculates, according to parameters acquired by the eNB, QoS parameters that need to be maintained by a certain link, a specific method is provided by taking step 604 of the above embodiment as an example. It should be noted that the specific method includes, but is not limited to, the method provided in the embodiment. For example, the method for calculating the delay parameter of a certain link in this embodiment includes the following steps:

S1. The eNB receives downlink delay statistics parameters $d_{RN2}^1$ and $d_{RN2}^2$ of the relay link RN2—>RN1 that are reported by the RN2 at two certain moments. In addition, the eNB acquires downlink delay statistics parameters $d_{eNB}^1$ and $d_{eNB}^2$ of the relay link eNB—>RN2 at the above two moments by itself, with superscripts in the parameters indicating the reporting moments. The eNB may acquire downlink delay statistics parameters $d_{RN1}^1$ and $d_{RN1}^2$ of an access link RN1—>UE according to $d_{RN2}^1$, $d_{RN2}^2$, $d_{eNB}^1$, and $d_{eNB}^2$.

S2. The eNB calculates mean delay statistics $d_{RN1}$, $d_{RN2}$, and $d_{eNB}$ within the time segment between the two moments according to the downlink delay statistics parameters at the two moments.

S3. The eNB sets margins $d_{RN1}+\alpha_1$, $d_{RN2}+\alpha_2$, and $d_{eNB}+\alpha_3$ for the mean delay statistics of each hop link according to the transmission change (for example, the mean square error of the delay) of a service in each hop link within the time segment and in combination with the topology structure (for example, the number of hops in a transmission link) of a radio interface, to acquire $(d_{RN1}+\alpha_1)+(d_{RN2}+\alpha_2)+(d+\alpha_3)=PDB$, eNB where PDB indicates a delay parameter that needs to be maintained in a UE<—>eNB transmission link.

S4. The eNB sets delay parameters $D_1$, $D_2$, and $D_3$ that need to be maintained by each hop link to $D_1=d_{RN1}+\alpha_1$, $D_2=d_{RN2}+\alpha_2$, and $D_3=d_{eNB}+\alpha_3$.

In steps 408, 506, 609, 613, 706, and 713, the step that the RN acquires QoS parameters that need to be maintained in a transmission path and radio interface topology information in the transmission path is also included. The following two cases are included:

In one case, an S1 interface of a mobility management entity (Mobility Management Entity, MME for short) on a core network is terminated on the eNB. In this way, in a bearer setup process, the eNB receives QoS parameters of an EPS bearer that are sent by the MME, and maps the QoS parameters of the EPS bearer to the QoS parameters of an RB, where the QoS parameters of the RB are the QoS parameters that need to be maintained in the UE<—>eNB transmission path in this embodiment of the present invention. Then, the eNB may carry QoS parameters that need to be maintained in the transmission path and the radio interface topology information in an RRC connection reconfiguration message or other RRC messages, and deliver the RRC connection reconfiguration message or other RRC messages to each RN corresponding to each hop link or to an RN that is directly connected to the eNB. Then, the RNs forward the QoS parameters that need to be maintained in the transmission path and the radio interface topology information to lower RNs in sequence.

In another case, in a two-hop transmission link (UE<—>RN<—>eNB), the S1 interface of an MME on a core network is terminated on an access RN. In this case, in a bearer setup process, the RN may directly receive QoS parameters of an EPS bearer that are sent from the MME; map the QoS parameters of the EPS bearer to the QoS parameters of an RB, where the QoS parameters of the RB are the QoS parameters that need to be maintained in the UE<—>eNB transmission path; and acquire radio interface topology information from the eNB. In addition, the access RN also needs to transfer the QoS parameters of the EPS bearer back to the eNB, where the QoS parameters are received by the access RN.

Figure 8:
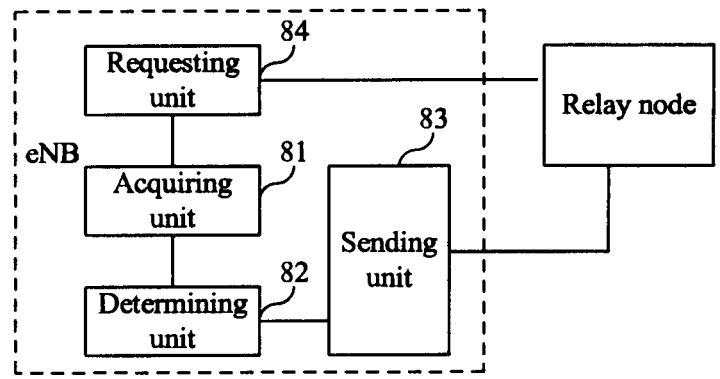
FIG. 8 is a schematic structural diagram of a base station according to an embodiment of the present invention.

FIG. 8 is a schematic structural diagram of a base station according to an embodiment of the present invention. As shown in FIG. 8, the base station includes an acquiring unit 81 and a determining unit 82. The acquiring unit 81 is configured to acquire, in a data transmission process in a transmission path from a UE to a base station, statistics of QoS parameters of a relay link in the transmission path, where the statistics of the QoS parameters of the relay link are statistics collected on changed QoS parameters in the relay link. The determining unit 82 is configured to determine, according to the statistics of the QoS parameters acquired by the acquiring unit 81 and in combination with QoS parameters that need to be maintained in the transmission path and radio interface topology information in the transmission path, QoS parameters that need to be acquired by an access link and the relay link in the transmission path.

The base station provided in this embodiment may further include a sending unit 83 and a requesting unit 84. The sending unit 83 is configured to send the QoS parameters that need to be acquired by the access link and the relay link as determined by the determining unit 82 to an RN responsible for scheduling the access link and the relay link. The requesting unit 84 is configured to send a request for acquiring the statistics of the QoS parameters of the relay link in the transmission path to each RN, so that the acquiring unit 81 acquires the statistics of the QoS parameters of the relay link.

For the method that the base station provided in this embodiment determines the QoS parameters that need to be acquired by the access link and relay link in the transmission path on a real-time basis, reference can be made to the foregoing method embodiments, and details are not further described herein again.

With the base station provided in this embodiment, in a data transmission process in a transmission path from a UE to a base station, when an actual transmission condition is changed, the base station may acquire statistics of a changed QoS parameter, and calculate QoS parameters that need to be maintained by each link in the transmission path. In this way, the base station can determine the QoS parameters that need to be maintained by each link in a transmission path from the base station to the UE on a real-time basis.

Figure 9:
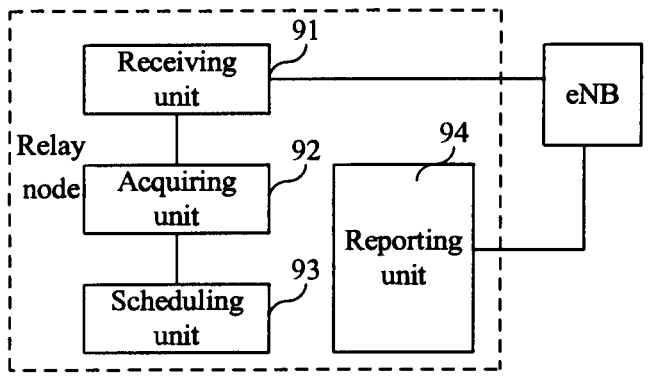
FIG. 9 is a schematic structural diagram of a relay node according to an embodiment of the present invention.

FIG. 9 is a schematic structural diagram of a relay node according to an embodiment of the present invention. As shown in FIG. 9, the relay node includes a receiving unit 91, an acquiring unit 92, and a scheduling unit 93. The receiving unit 91 is configured to receive, in a data transmission process in a transmission path from a UE to a base station, QoS parameters that are sent from the base station and need to be acquired by local-hop links, where the QoS parameters that need to be acquired by the local-hop links are determined by the base station according to acquired statistics of QoS parameters of a relay link in the transmission path and in combination with QoS parameters that need to be maintained in the transmission path and radio interface topology information in the transmission path, and the local-hop links are direct links of RNs from the UE to RNs in the transmission path and include an access link and the relay link in the transmission path. The acquiring unit 92 is configured to acquire, according to the QoS parameters that are received by the receiving unit 91 and need to be acquired by the local-hop links, QoS parameters that need to be maintained by the local-hop links. The scheduling unit 93 is configured to make a scheduling decision on the local-hop links according to the QoS parameters that are acquired by the acquiring unit 92 and need to be maintained by the local-hop links, to maintain QoS of a traffic flow corresponding to the QoS parameters.

The RN provided in this embodiment may further include a reporting unit 94 configured to report the statistics of the QoS parameters of the relay link in the transmission path to the base station in a periodic or an event-triggered manner.

For the method that the RN provided in this embodiment acquires QoS information needed for scheduling the local-hop links, reference can be made to the foregoing method embodiments, and details are not further described herein.

With the relay node provided in this embodiment, in a data transmission process in a transmission path from a UE to an eNB, when an actual transmission condition is changed, the eNB may acquire statistics of a changed QoS parameter, calculate QoS parameters that need to be maintained by each link in the transmission path, and deliver the calculated QoS parameters that need to be maintained by each link to each RN. In this way, the RNs can acquire QoS information needed for scheduling the local-hop links on a real-time basis, so as to perform real-time maintenance on the QoS of a traffic flow.

Figure 10:
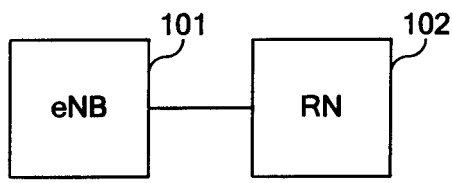
FIG. 10 is a schematic structural diagram of a system for maintaining QoS on a multi-hop network according to an embodiment of the present invention.

FIG. 10 is a schematic structural diagram of a system for maintaining QoS on a multi-hop network according to an embodiment of the present invention. As shown in FIG. 10, the system for maintaining QoS on a multi-hop network includes an eNB 101 and an RN 102 configured to maintain QoS on a multi-hop network. The eNB 101 for maintaining QoS on a multi-hop network includes units and functions in the embodiment shown in FIG. 8. The RN 102 configured to maintain QoS on a multi-hop network includes units and functions in the embodiment shown in FIG. 9. Details are not further described herein.

With the system for maintaining QoS on a multi-hop network in this embodiment, in a data transmission process in a transmission path from a UE to an eNB, when an actual transmission condition is changed, the eNB may acquire statistics of a changed QoS parameter, and calculate QoS parameters that need to be maintained by each link in the transmission path, so that the eNB may determine QoS parameters that need to be maintained by each link in the transmission path from the eNB to the UE on a real-time basis. In addition, the eNB may deliver the calculated QoS parameters that need to be maintained by each link to each RN, so that the RNs can acquire QoS information needed for scheduling the local-hop links on a real-time basis, so as to perform real-time maintenance on the QoS of a traffic flow.

Persons of ordinary skill in the art should understand that all or part of the steps in the preceding method embodiments may be implemented by a computer program instructing related hardware. The program may be stored in a computer accessible storage medium. When the program is executed, the processes of the preceding method embodiments may be included. The storage medium may be a magnetic disk, a CD-ROM, a read-only memory (Read-Only Memory, ROM), or a random access memory (Random Access Memory, RAM).

Finally, it should be noted that the above embodiments are merely provided for describing the technical solutions of the present invention, but not intended to limit the present invention. Although the present invention has been described in detail with reference to the foregoing embodiments, persons of ordinary skill in the art should understand that various modifications can be made to the technical solutions of the foregoing embodiments or and variations can be made to some technical features of the embodiments, and such modifications and variations cannot make the essence of the corresponding technical solutions depart from the spirit and the scope of the technical solutions of the embodiments of the present invention.

What is claimed is:

1. A method for determining quality of service parameters on a multi-hop network, comprising:
   in a data transmission process in a transmission path from a user equipment to a base station, acquiring statistics of quality of service QoS parameters of a relay link in the transmission path, wherein the statistics of the QoS parameters of the relay link are statistics collected on changed QoS parameters in the relay link; and
   determining, according to the statistics of the QoS parameters of the relay link and in combination with QoS parameters that need to be maintained in the transmission path and radio interface topology information in the transmission path, QoS parameters that need to be acquired by an access link and the relay link in the transmission path.

2. The method according to claim 1, wherein the acquiring the statistics of the QoS parameters of the relay link in the transmission path comprises:
   acquiring statistics of QoS parameters of a direct relay link in the transmission path; or
   when receiving a data feedback response, acquiring statistics of QoS parameters of a direct relay link in the transmission path, and receiving statistics that are of QoS parameters of other relay links and are reported by each relay node that is responsible for scheduling other relay links;
   wherein the direct relay link is a direct relay link between the base station and a relay node in the transmission path, and other relay links are relay links other than the direct relay link in the transmission path.

3. The method according to claim 1, wherein the acquiring the statistics of the QoS parameters of the relay link in the transmission path comprises:
   receiving statistics of QoS parameters of the relay link reported by each relay node.

4. The method according to claim 1, wherein the QoS parameters that need to be acquired by the access link and the relay link comprise:
   QoS parameters that need to be maintained by the access link and the relay link; or
   QoS parameters, which need to be acquired by the access link, that need to be maintained by other relay links in the transmission path other than the QoS parameters that need to be maintained by the access link, and QoS parameters, which need to be acquired by the relay link, that need to be maintained by the access link and other relay links other than the QoS parameters that need to be maintained by the relay link.

5. The method according to claim 1, further comprising: correspondingly determining the QoS parameters that need to be acquired by the access link and the relay link in the transmission path, and sending the QoS parameters that need to be acquired by the access link and the relay link to each relay node responsible for scheduling the access link and the relay link.

6. The method according to claim 5, wherein the sending the QoS parameters that need to be acquired by the access link and the relay link to each relay node responsible for scheduling the access link and the relay link comprises:
   in a bearer update process, sending, in a periodic or an event-triggered manner, the QoS parameters that need to be acquired by the access link and the relay link to each relay node responsible for scheduling the access link and the relay link, wherein the QoS parameters that need to be acquired by the access link and the relay link are carried in a radio resource control message.

7. The method according to claim 2, further comprising: sending a request for acquiring the statistics of the QoS parameters of the relay link in the transmission path to each RN, and acquiring the statistics of the QoS parameters of the relay link in the transmission path.

8. A method for maintaining quality of service on a multi-hop network, comprising:
   in a data transmission process in a transmission path from a user equipment to a base station, receiving quality of service QoS parameters that are sent from the base station and need to be acquired by a local-hop link, wherein the QoS parameters that need to be acquired by the local-hop link are determined by the base station according to acquired statistics of QoS parameters of a relay link in the transmission path and in combination with QoS parameters that need to be maintained in the transmission path and radio interface topology information in the transmission path, and the local-hop link is direct links of relay nodes from the user equipment to the relay nodes in the transmission path and comprise an access link and the relay link in the transmission path; and
   acquiring, according to the received QoS parameters that need to be acquired by the local-hop link, QoS parameters that need to be maintained by the local-hop link, and making a scheduling decision on the local-hop link to maintain QoS of a traffic flow corresponding to the QoS parameters.

9. The method according to claim 8, further comprising:
   correspondingly receiving the QoS parameters that are sent from the base station and need to be acquired by the local-hop link; and reporting, by each relay node, the statistics of the QoS parameters of the relay link in the transmission path to the base station in a periodic or an event-triggered manner.

10. The method according to claim 8, wherein the QoS parameters that need to be acquired by the local-hop link comprise:
    QoS parameters that need to be maintained by the local-hop link; or
    QoS parameters that need to be maintained by other links in the transmission path other than the QoS parameters that need to be maintained by the local-hop link.

11. The method according to claim 10, wherein the acquiring, according to the received QoS parameters that need to be acquired by the local-hop link, the QoS parameters that need to be maintained by the local-hops comprises:
    calculating out, by each relay node according to the received QoS parameters that need to be maintained by other links, the QoS parameters that need to be maintained in the transmission path, and radio interface topology information in the transmission path, the QoS parameters that need to be maintained by the local-hop link.

12. The method according to claim 11, wherein acquiring, by each relay node, the QoS parameters that need to be maintained in the transmission path comprises:
    receiving, by each relay node, the QoS parameters that are sent from the base station and need to be maintained in the transmission path; and acquiring, by the base station, the QoS parameters that need to be maintained in the transmission path from a bearer setup request message sent from a core network; or
    receiving, by each relay node, a bearer setup request message sent from a core network, and acquiring the QoS parameters that need to be maintained in the transmission path from the bearer setup request message.

13. A base station, comprising:
    an acquiring unit, configured to acquire, in a data transmission process in a transmission path from a user equipment to a base station, statistics of quality of service QoS parameters of a relay link in the transmission path, wherein the statistics of the QoS parameters of the relay link are statistics collected on changed QoS parameters in the relay link; and
    a determining unit, configured to determine, according to the statistics of the QoS parameters of the relay link acquired by the acquiring unit and in combination with QoS parameters that need to be maintained in the transmission path and radio interface topology information in the transmission path, QoS parameters that need to be acquired by an access link and the relay link in the transmission path.

14. The base station according to claim 13, further comprising a sending unit configured to send the QoS parameters that need to be acquired by the access link and the relay link as determined by the determining unit to each relay node responsible for scheduling the access link and the relay link.

15. The base station according to claim 14, further comprising:
a requesting unit, configured to send a request for acquiring the statistics of the QoS parameters of the relay link in the transmission path to each relay node.

16. A relay node, comprising:
a receiving unit, configured to receive, in a data transmission process in a transmission path from a user equipment to a base station, quality of service QoS parameters that are sent from the base station and need to be acquired by a local-hop link, wherein the QoS parameters that need to be acquired by the local-hop link are determined by the base station according to acquired statistics of QoS parameters of a relay link in the transmission path and in combination with QoS parameters that need to be maintained in the transmission path and radio interface topology information in the transmission path, and the local-hop link is direct links of relay nodes from the user equipment to the relay nodes in the transmission path and comprise an access link and the relay link in the transmission path;
an acquiring unit, configured to acquire, according to the QoS parameters that are received by the receiving unit and need to be acquired by the local-hop link, QoS parameters that need to be maintained by the local-hop link; and
a scheduling unit, configured to make a scheduling decision on the local-hop link according to the QoS parameters that are acquired by the acquiring unit and need to be maintained by the local-hop link to maintain QoS of a traffic flow corresponding to the QoS parameters.

17. The relay node according to claim 16, further comprising:
a reporting unit, configured to report the statistics of the QoS parameters of the relay link in the transmission path to the base station in a periodic or an event-triggered manner.

* * * * *

UNITED STATES PATENT AND TRADEMARK OFFICE
CERTIFICATE OF CORRECTION

| | | |
|---|---|---|
| PATENT NO. | : 8,681,652 B2 | |
| APPLICATION NO. | : 13/361203 | |
| DATED | : March 25, 2014 | |
| INVENTOR(S) | : Chang et al. | |

It is certified that error appears in the above-identified patent and that said Letters Patent is hereby corrected as shown below:

In the Claims

Column 20, Line 34, in Claim 11, delete "local-hops" and insert -- local-hop link --, therefor.

Signed and Sealed this
Twenty-ninth Day of July, 2014

Michelle K. Lee
*Deputy Director of the United States Patent and Trademark Office*